Nov. 19, 1957     K. HIRD     2,813,732
ANTI-ROTATE SNAP RING
Filed March 13, 1956
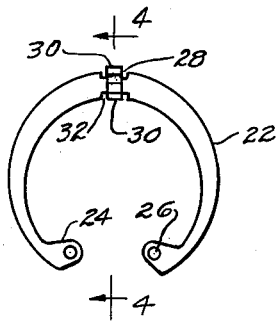
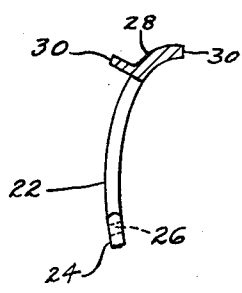
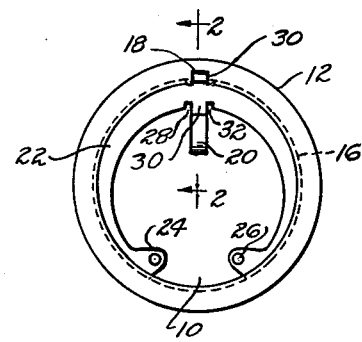
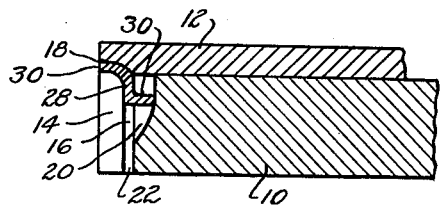
INVENTOR.
KENNETH HIRD
ATTORNEYS

United States Patent Office 2,813,732
Patented Nov. 19, 1957

2,813,732

ANTI-ROTATE SNAP RING

Kenneth Hird, Andover, Mass., assignor to the United States of America as represented by the Secretary of the Air Force Application March 13, 1956, Serial No. 571,359

10 Claims. (Cl. 287—53)

This invention relates to retaining rings and, more particularly, to improved retaining or snap rings for use in removably securing machine parts against relative movement.

In removably securing assembled machine parts, such as a shaft positioned in a housing for locking the shaft against relative axial movement, heretofore, it has been customary to employ an open locking or retaining ring, for example, a Waldes ring, which may be removably inserted in a groove provided on the shaft, or in the housing member, thereby preventing relative axial movement of the shaft. However, if it is, also, desired to lock the retained shaft against relative rotation in the housing member, it is necessary to employ additional locking means, such as a key or the like, for keying the shaft to the housing.

It is therefore the purpose of the present invention to provide a new and improved retaining ring of the type employed in assemblies of mechanical parts for simultaneously keying, for instance, a shaft to a housing or the like, and locking the shaft against axial movement in the housing.

The present invention further provides an anti-rotate retaining ring of simple construction, easy to manufacture, and which ring may be snapped into or out of operative position by a single operation, thus simplifying the operation of removably locking assembled mechanical parts for preventing relative movement therebetween by reducing the number of parts heretofore required. A snap ring, according to the present invention, may further be flat or bowed for taking up tolerances resiliently external or internal in nature.

According to the present invention, the retaining snap ring comprises an arcuate body formed with lugs projecting axially therefrom and arranged to be inserted in a groove provided therefore in a housing within which a shaft is supported, the housing and the shaft also provided with keyways arranged to receive the lugs of the snap ring for keying the shaft to the housing and thereby preventing relative rotation and axial movement of the shaft within the housing.

These and other features of the present invention are described in detail below in connection with the accompanying drawings, in which;

Figure 1 is a front elevation of a shaft locked to a housing by a snap ring embodying the present invention for preventing relative movement of the shaft therein;

Figure 2 is a fragmentary longitudinal section taken along the line 2—2 in Figure 1;

Figure 3 is a front elevation of the snap ring of Figure 1; and

Figure 4 is a section taken along the line 4—4 in Figure 3.

Referring now in detail to the drawing, wherein like numerals designate like parts throughout the several views, the embodiment of the anti-rotate snap ring assembly of the present invention is illustrated in the drawing as applied to a shaft 10 supported in a housing member 12 having a bore 14 slidably receiving the shaft 10 therein. The housing member 12 is further provided with an annular groove 16 formed in the bore 14 and adjacent an end of the housing member 12. At the same end, the housing member 12 is also provided with a keyway 18 extending axially and formed preferably at the upper portion of the housing 12 and adjacent to the groove 16, the keyway 18 extending into the groove 16 for a purpose as hereinafter described.

The shaft 10 is, likewise, provided with a keyway 20 formed in an end face arranged to be adjacent the end of the housing member 12 formed with the groove 16 and the keyway 18. The keyway 20 may extend to the outer cylindrical surface of the shaft 10, as shown in Figure 2, and is arranged to be aligned axially with the keyway 18 of the housing member 12.

In accordance with the present invention, the shaft 10 may be locked to the housing 12 by a novel and simple resilient locking member or retaining snap ring 22 having an arcuate, substantially ring-shaped body with an inner and outer diameter, and formed with an open portion providing free ends thereon. The free ends are each formed with an enlarged portion or ear 24 which may be formed with a tool-receiving aperture 26. In inserting the snap ring 22 in position in the groove 16, the snap ring 22 may be reduced in diameter by engagement of the apertures 26 by any suitable tool, such as a pair of special pliers, in order to be passed through the bore 14 and be positioned in the groove 16. When the snap ring 22 is aligned with the groove 16, the ears 24 are then released so that the ring 22 may expand to its original shape and size due to the natural resiliency of the material to seat itself within the groove 16 thereby locking the shaft 10 in the housing 12 against axial movement therein by abutting against the end face of the shaft 10. Moreover, the bowed snap ring 22 seated in the groove 16 is compressed axially between the outer wall of the groove 16 and the end face of shaft 10 thereby exerting resilient endwise pressure against the shaft 10 and thereby taking-up tolerances to effectively secure the shaft 10 in a fixed position therein.

For keying the shaft 10 to the housing 12, the snap ring 22, according to the present invention, is integrally joined with a substantially radially extending elongated middle portion 28 having a pair of keying lugs or tabs 30 extending substantially axially therefrom, one of the tabs 30 extending axially from the outer peripheral or circular edge in one direction, and the other tab 30 extending axially from the inner peripheral or circular edge of the snap ring 22 in an opposite direction of that of one of the tabs 30.

It will be apparent, therefore, that with the snap ring 22 being inserted in the groove 16, the keying tabs 30 are simultaneously inserted in their respective keyways 18 and 20, the outer tab 30 being inserted in the housing keyway 18 and inner tab 30 being inserted in the shaft keyway 20, thereby locking the shaft 10 to the housing 12 for preventing relative rotation of the shaft 10 within the bore 14 of the housing 12.

As best shown in Figure 3, the snap ring 22 may be formed with fillets 32 at the intersection of the edges on either side of the elongated member 28 thereby increasing the strength to prevent failure by concentration of stresses at such intersections. However, the snap ring 22 may be formed without the fillets 32 without departing from the scope of the present invention.

The present invention has been described in detail above for purposes of illustration only and is not intended to be limited by this description or otherwise except as defined in the appended claims.

I claim:

1. A locking member arranged to be inserted in a groove provided therefor in a shaft housing slidably receiving a shaft in a bore therein for locking said shaft to said housing for preventing axial movement therebetween, said locking member comprising an arcuate body having lugs projecting substantially axially therefrom at substantially right angles to the plane of the body, said lugs adapted to be inserted in keyways provided therefor in said housing and said shaft for preventing rotation of said shaft in said housing.

2. A locking member arranged to engage a groove provided in a shaft housing accommodating a shaft slidably received in a bore therein for locking said shaft to said housing, said locking member comprising a resilient arcuate body adapted to be inserted in said groove for preventing axial movement of said shaft, and a pair of lugs projecting substantially axially at substantially right angles to the plane of the body and in opposite directions from said arcuate body, said lugs adapted to be inserted in axially aligned keyways provided in said housing and said shaft for preventing rotation of said shaft in said housing.

3. A locking member arranged to engage a groove provided in a shaft housing accommodating a shaft slidably received in a bore therein for locking said shaft to said housing, said locking member comprising a resilient arcuate body having free ends, a lug projecting substantially axially from an outer edge of said arcuate body in one direction substantially perpendicular to the plane of the body, and another lug projecting substantially axially from an inner edge of said arcuate body in another direction substantially perpendicular to the plane of the body, whereby said lugs are adapted to be inserted in complementary keyways provided in said housing and said shaft for preventing rotation of said shaft in said housing.

4. A retaining snap ring adapted to be inserted into a groove provided in a shaft housing having a bore for slidably receiving a shaft therein for locking said shaft to said housing for preventing axial movement therebetween, said retaining snap ring comprising a bowed resilient arcuate body adapted to be sprung into said groove for preventing axial movement of said shaft, said arcuate body having substantially axially projecting keying tabs integral therewith and disposed substantially at the middle portion of said arcuate body, one of said tabs projecting from the outer peripheral edge of said arcuate body substantially perpendicular to the plane of the body, and the other of said tabs projecting from an inner peripheral edge of said arcuate body substantially perpendicular to the plane of the body whereby said tabs are adapted to be inserted in keyways axially aligned in said housing and shaft thereby preventing rotation of said shaft in said housing.

5. A retaining snap ring adapted to be inserted into a groove provided therefor in a shaft housing having a bore slidably receiving a shaft therein for locking said shaft to said housing, said retaining snap ring comprising a resilient arcuate body having free ends and adapted to be inserted into said groove for preventing axial movement of said shaft in said housing, said arcuate body having a radially extending middle portion provided with a pair of tabs projecting substantially axially at substantially right angles to the plane of the body and in opposite directions therefrom, whereby said tabs are adapted to be inserted in keyways provided in said housing and said shaft thereby preventing rotation of said shaft with respect to said housing.

6. In combination, a shaft housing having a bore joined with a keyway at an end thereof and slidably receiving in said bore a shaft formed with a complementary keyway at an end thereof, and a retaining snap ring having axially projecting keying tabs at substantially right angles to the plane of the ring and removably inserted in said keyways for locking said shaft to said housing for preventing rotation therebetween.

7. In combination, a shaft housing having a bore provided with an annular groove adjacent one end thereof and slidably receiving a shaft therein, said housing and said shaft each provided with a keyway axially aligned, and a locking member having a resilient arcuate portion removably positioned in said annular groove for preventing axial movement of said shaft, and lugs projecting axially from said member in opposite directions thereof at substantially right angles to the plane of the member and removably positioned in said keyways for preventing rotation of said shaft in said housing.

8. A retaining snap assembly comprising the combination of a shaft housing having a bore provided with an annular groove and a keyway, a shaft positioned in said housing bore and having a keyway axially aligned with said housing keyway, and a retaining snap ring removably positioned in said housing groove and having one tab axially projecting from the outer peripheral edge thereof substantially perpendicular to the plane of the ring, and another tab projecting axially from the inner peripheral edge thereof substantially perpendicular to the plane of the ring, said tabs removably positioned in said keyways for locking said shaft to said housing against rotation.

9. A retaining snap ring assembly comprising the combination of a shaft housing having a bore provided with an annular groove and a keyway at an end thereof, a shaft provided with a complementary keyway positioned in said housing bore, and a retaining snap ring having a resilient arcuate body removably positioned in said groove for preventing axial movement of said shaft, said arcuate body having an elongated middle portion formed with a pair of tabs projecting axially therefrom at substantially right angles to the plane of the body and at opposite sides of said arcuate body, said tabs removably positioned in said keyways for preventing rotation of said shaft in said housing.

10. A retaining snap ring assembly comprising the combination of a shaft housing having a bore formed with an annular groove and a keyway, a shaft formed with a complementary keyway thereon slidably positioned in said housing bore, and a retaining snap ring having a resilient arcuate body provided with free ends removably positioned in said housing groove for preventing axial movement of the shaft, said arcuate body having a radially extending middle portion formed with a pair of tabs projecting at right angles to the plane of the body in opposite axial directions and being removably inserted in said keyways thereby locking said shaft against rotation in said housing.

References Cited in the file of this patent

UNITED STATES PATENTS

| 783,258 | Trenot | Feb. 21, 1905 |
| 1,127,022 | Knight | Feb. 2, 1915 |
| 1,362,215 | Appelt | Dec. 14, 1920 |
| 2,426,219 | Jackson | Aug. 26, 1947 |
| 2,509,081 | Bluth et al. | May 23, 1950 |
| 2,595,787 | Heimann | May 6, 1952 |